May 25, 1965   A. D. MORTRUDE   3,184,766
PASSENGER ACCOMMODATIONS FOR VEHICLE
Filed Feb. 24, 1964   4 Sheets-Sheet 1

INVENTOR
ALBERT D. MORTRUDE
BY
ATTORNEY

May 25, 1965  A. D. MORTRUDE  3,184,766

PASSENGER ACCOMMODATIONS FOR VEHICLE

Filed Feb. 24, 1964  4 Sheets-Sheet 3

INVENTOR
ALBERT D. MORTRUDE
BY
ATTORNEY

May 25, 1965   A. D. MORTRUDE   3,184,766
PASSENGER ACCOMMODATIONS FOR VEHICLE
Filed Feb. 24, 1964   4 Sheets-Sheet 4

INVENTOR
ALBERT D. MORTRUDE
BY
ATTORNEY

United States Patent Office 3,184,766
Patented May 25, 1965

3,184,766
PASSENGER ACCOMMODATIONS FOR VEHICLE
Albert D. Mortrude, Pompano Beach, Fla., assignor to Clark Equipment Company, a corporation of Michigan
Filed Feb. 24, 1964, Ser. No. 346,819
9 Claims. (Cl. 5—118)

This invention relates to accommodations in a vehicle, and more specifically to an arrangement of benches for accommodating persons in seated positions, and which is convertible to accommodate persons in supine of prone positions for sleeping, and the like.

In trailers, boats and self-propelled motor homes, for example, in which living accommodations, including sleeping facilities, are provided, space is at a premium. Inasmuch as sleeping accommodations require a substantial amount of space they are often inadequate. Frequently, such sleeping accommodations comprise merely a series of narrow, short bunks that may even be irregular in shape. Therefore, a principal object of my invention is to provide improved sleeping accommodations suitable for use in trailers, boats, self-propelled motor homes and the like.

Another object of my invention is to provide a bench arrangement which is convertible into two beds.

Another object of my invention is to provide a bench arrangement which is convertible into sleeping accommodations which require a minimum of space.

In carrying out my invention in a preferred embodiment I provide first and second benches disposed in back-to-back relationship and a third bench disposed in facing relationship with the second bench. The first bench and the back of the second bench may be disposed to form one bed, and the back of the third bench and the seats of the second and third benches may be disposed to form a second bed. The first and second beds are located at different elevations and in partially overlapping relation.

The above and other objects, features and advantages of my invention will become more readily apparent to persons skilled in the art from the following detailed description taken in conjunction with the accompanying drawing in which.

Figure 1:
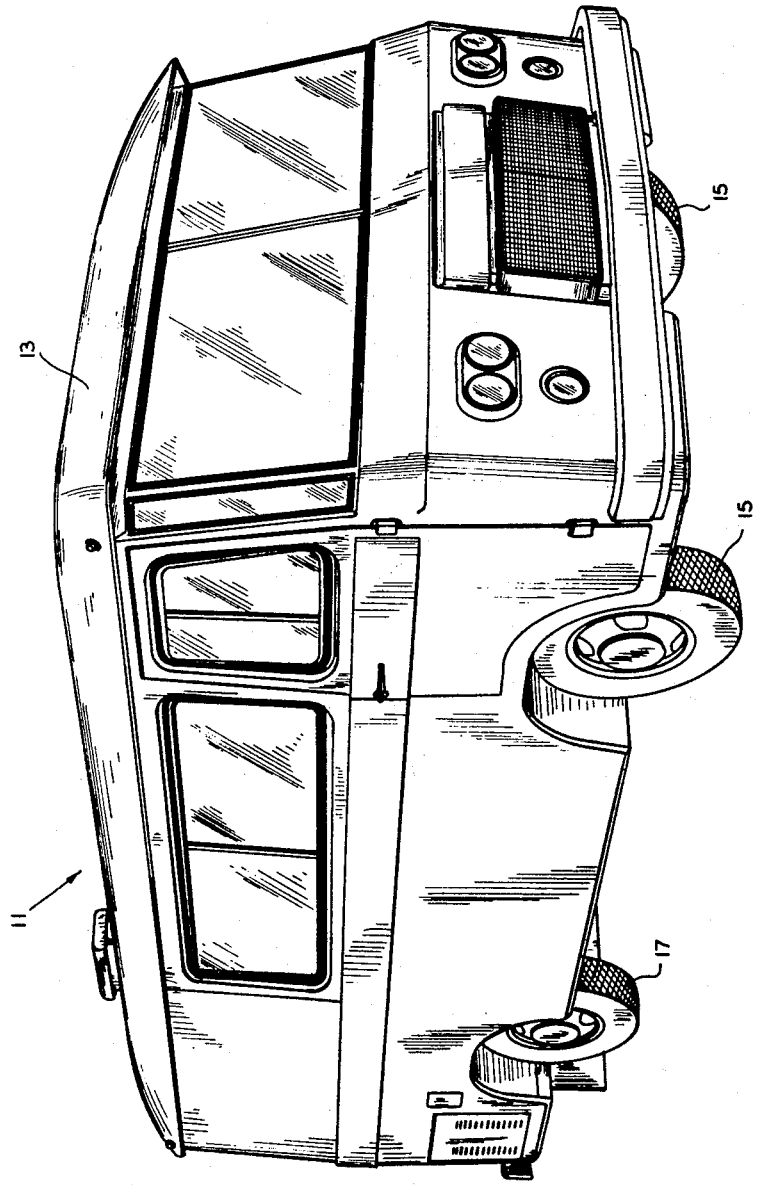
FIGURE 1 is a perspective view of a motor home which embodies my invention.
Figure 2:
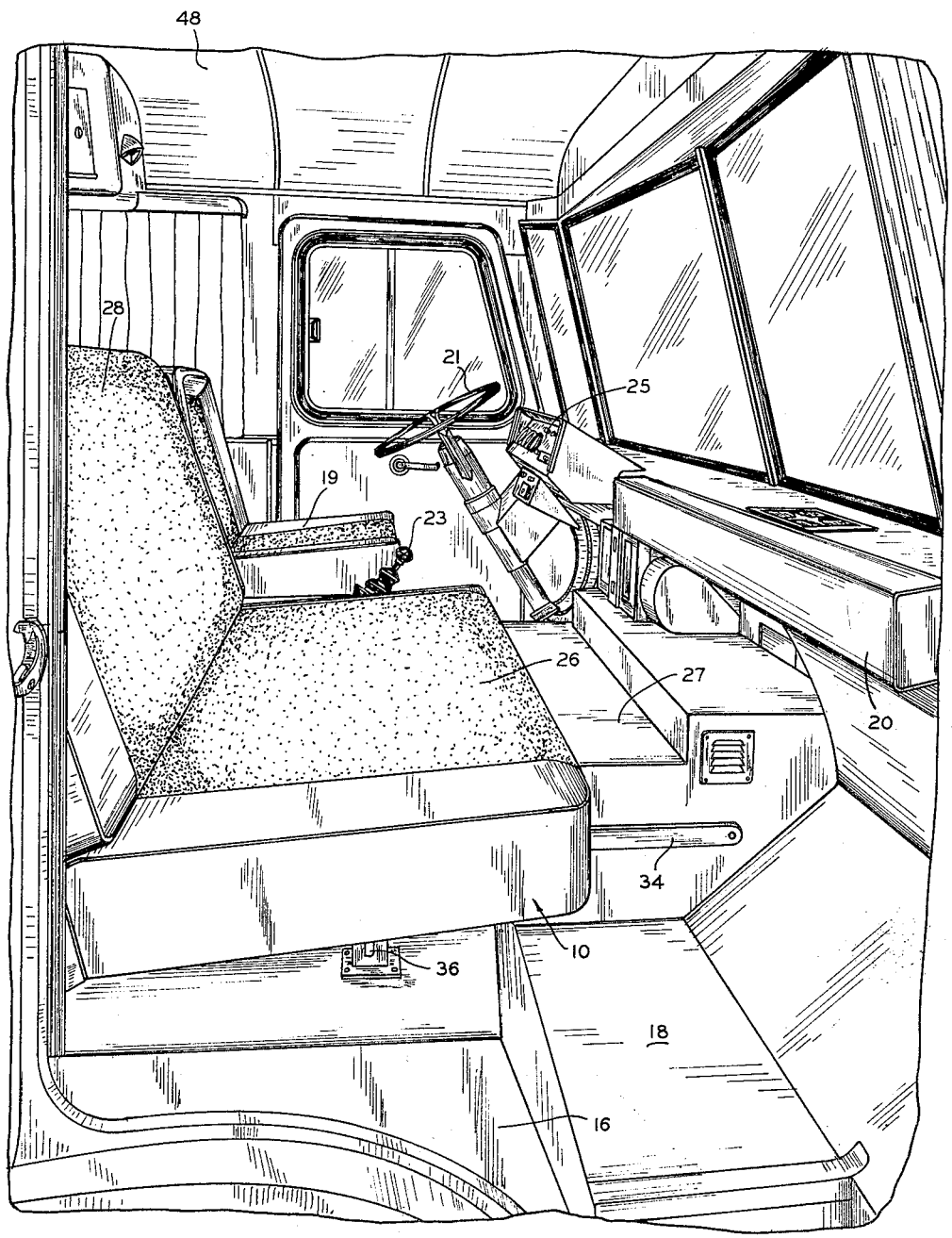
FIGURE 2 is a perspective view showing the operator's compartment of the motor home and one of the benches.

Referring to FIGS. 1 and 2, there is shown a self-propelled motor home 11 which embodies my invention. Motor home 11 includes a body 13 which is supported by a pair of front wheels 15 which are drive-steer wheels and a pair of rear wheels 17 (only one of which is shown). The interior of motor home 11 is equipped with complete living accommodations and includes an operator's compartment in the left front corner of the interior. The operator's compartment includes an operator's seat 19, a steering control wheel 21, a transmission shift control lever 23 and an instrument panel 25. Located in the right front corner of the interior of motor home 11 is a bench 10 which is mounted on a raised portion 16 of floor 18 adjacent a padded dashboard 20. Bench 10 partially overlays an engine compartment 27 which is disposed generally between bench 10 and operator's seat 19.

Figure 3:
FIGURE 3 is a perspective view of my invention showing the benches disposed to form a pair of beds.
Figure 4:
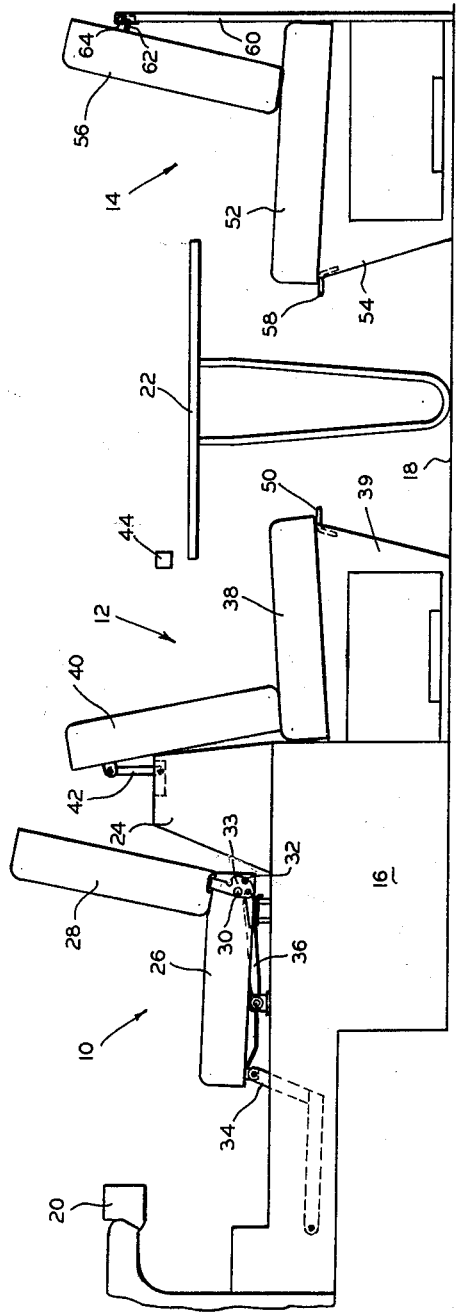
FIGURE 4 is a schematic side elevation of the bench arrangement disposed in sitting position.
Figure 5:
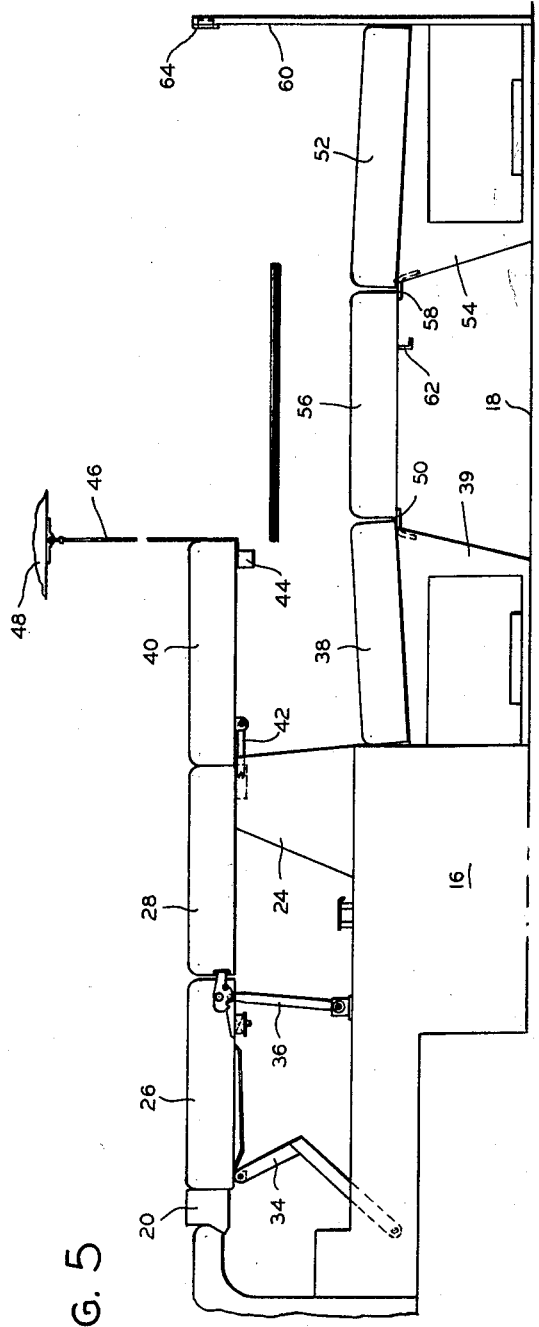
FIGURE 5 is similar to FIG. 4, but with the benches disposed in sleeping positions.

Referring now also to FIGS. 3, 4 and 5, the living accommodations provided in the interior of the motor home 11 include two more benches which are designated by the reference numerals 12 and 14. Bench 12 is located rearwardly of bench 10 and in back-to-back relationship therewith. Bench 14 is longitudinally spaced from bench 12 and disposed in facing relationship therewith. A removable table 22 may be conveniently disposed between the facing benches 12 and 14 to provide a dining area. Located between benches 10 and 12 is a support member 24 which is mounted on raised portion 16 for a purpose which will be made clear shortly.

Bench 10 includes a seat 26 to which a back 28 is pivotally connected at 30. Back 28 may be locked either in the vertically inclined position shown in FIG. 4 or in the horizontal position in line with seat 26 as shown in FIG. 5 by means of a pin 32 which engages either one of a pair of slots in bracket 33. Seat 26 is connected to raised portion 16 by means of a parallelogram linkage which includes a link 34 pivotally connected at one end to seat 26 and at the other end to motor compartment 27, and a pair of laterally spaced-apart links 36 pivotally connected at one end to seat 26 and at the other end to raised portion 16. Thus, bench 10 may occupy the position shown in FIG. 4 or may be moved to a raised and slightly forward position shown in FIG. 5. When bench 10 is in a raised or sleeping position the back 28 may be pivoted to a horizontal position aligned with seat 26. It will be noted that when the back 28 is in the position shown in FIG. 5 it is partially supported by support member 24. Also, when seat 26 is in the raised and forward position the front edge thereof is in abutment with padded dashboard 20.

Bench 12 includes a seat 38 which is mounted on a seat support 39. Also, bench 12 includes a back 40 which is connected to support member 24 by means of a link 42 which is pivotally connected at one end to back 40 and at the other end to support member 24. Thus, back 40 may be located in a vertically inclined position, as shown in FIG. 4, or pivoted to a horizontal position in longitudinal alignment with seat 26 and back 28, as shown in FIG. 5. When back 40 is in the raised horizontal position shown in FIG. 5, it is partially supported adjacent the top edge thereof by support member 24 and partially supported adjacent the bottom edge by a block 44 fastened to the adjacent wall 45 (FIG. 3) and a strap 46 which is fastened to the bottom edge of back 40 and removably fastened to the ceiling 48, as shown in FIG. 5. Extending outwardly from seat support 39 are bracket means 50, the purpose of which will be explained shortly.

Bench 14 includes a seat 52 mounted on a seat support 54 and a back 56. Extending outwardly from seat support 54 are bracket means 58 which together with bracket means 50 support back 56 between seats 38 and 52 when benches 12 and 14 are converted to a bed as shown in FIG. 5. Back 56 is removably connected to a vertically extending panel 60 by means of a hook 62 which engages a slotted plate 64.

When it is desired to use the benches for sitting they are disposed as shown in FIG. 4. Now, if it is desired to convert the benches into two beds, the table 22 is removed from between benches 12 and 14. Then, back 56 is removed from the position shown in FIG. 4 and disposed between seats 38 and 52 and supported by brackets 50 and 58, as shown in FIG. 5. Next, back 40 is raised to the horizontal position shown in FIG. 5 where it is partially supported by block 44 and strap 46 which is attached to ceiling 48. Finally, seat 26 is raised and moved forwardly to the position shown in FIG. 5 and back 28 is lowered to the position shown in FIG. 5. The top edge of back 28 abuts the top edge of back 40 in this position, and so prevents seat 26 from moving downwardly. It will now be seen that back 40 is located over seat 38, thereby providing a substantial overlap of the two beds. The beds require about two feet less space longitudinally of the vehicle than would be required if they were disposed end-to-end. It will be noted that benches 12 and 14 can be made into a bed comprising seats 38 and 52 and back 56 while leaving bench 10 undisturbed, or benches 10 and 12 can be made into a bed comprising seat 26 and backs 28 and 40 while leaving bench 14 undisturbed. Further, the conversion of the benches into beds in no manner interferes with the operation of the vehicle or visibility from the operator's compartment.

While an illustrative embodiment of my invention has been shown and described herein, it is obvious that various modifications may be made thereto by those skilled in the art without departing from the spirit and scope thereof. Therefore, I do not intend for my invention to be limited, except by the terms of the following appended claims.

I claim:

1. In combination, a first bench having a seat and a back, said back being connected to said seat and pivotal to a position in substantial co-planar relation with said seat, means for supporting said bench in a raised position, a second bench having a seat and a back and disposed in back-to-back relationship with said first bench, said second bench back being actuatable to a position in substantially co-planar relation with the said first bench seat and back when the latter is disposed in said co-planar relation, a third bench having a seat and a back and disposed in facing relationship with the said second bench, the said third bench back being removable, and means for supporting the said third bench back between the said second and third bench seats and in substantially co-planar relation thereto.

2. In combination, a first bench having a seat and a back, the said back being pivotally connected to the said seat and pivotal to a position substantially in line with the said seat, means for supporting the said first bench in an elevated position, a second bench having a seat and a back and disposed in back-to-back relationship with the said first bench, a support member located between the said first and second benches, the said second bench back being pivotally connected to the said support member and pivotal to a position substantially in line with the said first bench seat and back when the said first bench seat is in the said elevated position and the said first bench back is in line with the said first bench seat, and means for supporting the said second bench back in the said position in line with the said first bench seat and back.

3. The combination as set forth in claim 2 and including a third bench having a seat and a back and disposed in facing relationship with the said second bench, the said third bench back being removable, and means for supporting the said third bench back between and in line with the said second and third bench seats.

4. In combination, a first bench having a seat and a back, means for supporting the said first bench in a raised position, a second bench having a seat and a back and disposed in back-to-back relationship with the said first bench, and a support member disposed between the said benches, the said first-mentioned back being pivotally connected to the said first-mentioned seat and pivotal to a substantially horizontal position in longitudinal alignment with the said first-mentioned seat when the said first-mentioned bench is in the said raised position, the said first-mentioned back being at least partially supported by the said support member in its horizontal raised position, the said second-mentioned back being pivotally connected to said support member and pivotal to a substantially horizontal position in longitudinal alignment with the said first-mentioned seat when the said first-mentioned seat is in the said raised position and in abutment with the said first-mentioned back when the said first-mentioned back is in its raised horizontal position.

5. A bench arrangement for vehicles comprising a first bench, a second bench disposed in back-to-back relationship with and spaced longitudinally from said first bench, said second bench having a seat and a back, said first bench and said back being actuatable to cooperating elevated positions to form a bed, and a third seat disposed in facing relation and spaced longitudinally from said second bench, said third bench and said seat being actuatable to cooperating positions to form a bed, a portion of one of said beds being disposed in overlapping relationship to the other of said beds.

6. For use in a vehicle having an operator's compartment, the combination comprising a first bench spaced laterally from the operator's compartment, said first bench having a seat and a back, means for supporting the said first bench in a raised position, a second bench having a seat and a back and disposed in back-to-back relationship with the said first bench, and a support member disposed between the said benches, the said first-mentioned back being pivotally connected to the said first-mentioned seat and pivotal to a substantially horizontal position in longitudinal alignment with the said first-mentioned seat when the said first-mentioned bench is in the said raised position, the said first-mentioned back being at least partially supported by the said support member in its horizontal position, the said second-mentioned back being pivotally connected to said support member and pivotal to a substantially horizontal position in longitudinal alignment with the said first-mentioned seat when the said first-mentioned seat is in the said raised position and in abutment with the said first-mentioned back when the said first-mentioned back is in its raised horizontal position.

7. In an elongated vehicle, the combination of an operator's compartment, a first bench laterally spaced-apart from said operator's compartment and having a seat and a back, means for supporting the said first bench in a raised position, a second bench having a seat and a back and disposed in back-to-back relationship with the said first bench, a support member disposed between the said benches, the said first-mentioned back being pivotally connected to the said first-mentioned seat and pivotal to a substantially horizontal position co-planar with the said first-mentioned seat when the said first-mentioned seat is in the said raised position, the said first-mentioned back being at least partially supported by the said support member in its horizontal position, the said second-mentioned back being pivotally connected to said support member and pivotal to a substantially horizontal position co-planar with the said first-mentioned seat when the said first-mentioned seat is in the said raised position and in abutment with the said first-mentioned back when the said first-mentioned back is in its horizontal position.

8. The combination as set forth in claim 7 and including a third bench having a seat and a back and disposed in facing relationship with the said second bench, the said third-mentioned back being removable, and means for supporting the said third-mentioned back between and in line with the said second and third-mentioned seats.

9. For use in a vehicle having an operator's compartment, the combination comprising a first bench spaced laterally from the operator's compartment, a second bench disposed in back-to-back relation to and longitudinally spaced from said first bench, said second bench including a seat and a back, said back cooperating with said first bench to form a first bed in an elevated position, and a third bench longitudinally spaced from said second bench, said third bench cooperating with said seat to form a second bed spaced vertically from said first bed.

References Cited by the Examiner

UNITED STATES PATENTS

| | | | |
|---|---|---|---|
| 1,608,064 | 11/26 | Henry | 297—65 |
| 2,326,972 | 8/43 | Rosin | 296—64 X |
| 2,638,374 | 5/53 | Willson | 5—118 X |
| 3,097,876 | 7/63 | Willson | 296—64 X |

FOREIGN PATENTS 810,294   5/62   Canada.

FRANK B. SHERRY, *Primary Examiner.*